(12) United States Patent
Junk et al.

(10) Patent No.: US 9,944,783 B2
(45) Date of Patent: Apr. 17, 2018

(54) POLYMER DISPERSIONS

(71) Applicant: CELANESE INTERNATIONAL CORPORATION, Irving, TX (US)

(72) Inventors: Matthias Junk, Alsbach-Hähnlein (DE); Ulrich Desor, Idstein (DE)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 23 days.

(21) Appl. No.: 14/948,791

(22) Filed: Nov. 23, 2015

(65) Prior Publication Data

US 2016/0145430 A1 May 26, 2016

Related U.S. Application Data

(60) Provisional application No. 62/083,426, filed on Nov. 24, 2014.

(51) Int. Cl.

| | |
|---|---|
| *C08L 33/12* | (2006.01) |
| *C08F 220/18* | (2006.01) |
| *C08F 265/06* | (2006.01) |
| *C08J 3/12* | (2006.01) |
| *C09D 133/12* | (2006.01) |
| *C08F 2/00* | (2006.01) |
| *C09D 151/00* | (2006.01) |
| *C09D 5/02* | (2006.01) |

(52) U.S. Cl.
CPC .............. *C08L 33/12* (2013.01); *C08F 2/001* (2013.01); *C08F 220/18* (2013.01); *C08F 265/06* (2013.01); *C08J 3/12* (2013.01); *C09D 5/02* (2013.01); *C09D 133/12* (2013.01); *C09D 151/003* (2013.01); *C08J 2333/12* (2013.01); *C08L 2201/54* (2013.01); *C08L 2205/025* (2013.01); *C08L 2308/00* (2013.01)

(58) Field of Classification Search
CPC ........ C08L 33/12; C08F 2/001; C08F 220/18; C08F 265/06; C08J 3/12; C09D 5/02; C09D 133/12; C09D 151/003

USPC .......................................................... 524/457
See application file for complete search history.

(56) References Cited

U.S. PATENT DOCUMENTS

| | | | |
|---|---|---|---|
| 3,745,196 A * | 7/1973 | Lane et al. ............ | C08F 265/06 525/291 |
| 3,804,881 A | 4/1974 | Bassett et al. | |
| 4,156,669 A * | 5/1979 | Lee ........................ | C08F 259/06 428/407 |
| 5,756,573 A | 5/1998 | Trumbo et al. | |
| 5,889,098 A | 3/1999 | Trumbo | |
| 6,617,389 B1 | 9/2003 | Delaunoit et al. | |
| 7,173,083 B2 | 2/2007 | Scheerder et al. | |
| 2012/0252972 A1* | 10/2012 | Balk ........................ | C08F 2/22 524/809 |
| 2014/0243552 A1 | 8/2014 | Ogasawara et al. | |
| 2014/0323608 A1 | 10/2014 | Deller et al. | |

FOREIGN PATENT DOCUMENTS

| | | |
|---|---|---|
| DE | 2535372 A1 | 2/1977 |
| DE | 10041680 A1 | 3/2002 |

* cited by examiner

*Primary Examiner* — Kelechi Egwim
(74) *Attorney, Agent, or Firm* — Roberts Mlotkowski Safran Cole & Calderon P.C.

(57) ABSTRACT

A polymer dispersion is produced by polymerization of at least two different ethylenically unsaturated monomers in at least first and second stages. The polymer produced in the first stage comprises 25 to 60% by weight of the total monomer composition and has a uniform glass transition temperature from −30° C. to 0° C. The polymer produced in the second stage comprises 40 to 75% by weight of the total monomer composition and has a variable monomer composition such that the second stage polymer has a non-uniform glass transition temperature which varies between a first value from −30° to +10° C. and second value of at least +70° C. Any polymer produced in further polymerization stages comprises no more than 10% by weight of the total monomer composition and the glass transition temperature of the hypothetical uniform copolymer produced by the total monomer composition is in the range from 0° C. to 25° C.

25 Claims, No Drawings

POLYMER DISPERSIONS

CROSS REFERENCE TO RELATED APPLICATIONS

This application claims the benefit of the filing date of U.S. Provisional Application No. 62/083,426 filed Nov. 24, 2014, the entire contents of which are incorporated herein by reference.

FIELD

The present invention relates to polymer dispersions useful as binders for coating compositions, such as high gloss trim paints, lacquers, stains and varnishes.

BACKGROUND

Polymer dispersions useful as binders for coating compositions, such as high gloss trim paints, have to comply with increasingly stringent requirements. Paint manufacturers are under pressure to minimize or eliminate volatile organic compounds (VOCs) in dispersion paints due to their toxicity and flammability (Directive 2004/42/CE of the European Parliament and The Council of The European Union). To avoid the need to include coalescent agents (since these are known to be the main contributors to VOCs in coating applications), the base polymer should have a minimum film forming temperature (MFFT) equal to or less than 5° C., preferably 0° C. Additionally, styrene-based monomers have been extensively used in the production of polymeric binders since they tend to increase the gloss of the resulting coatings because of their high refractive index and since they produce polymers with good block resistance. However, concerns about the adverse health effects of styrene-based polymers have led to increased interest in styrene-free dispersions.

There is therefore a need to develop a preferably styrene-free polymer dispersion which has an MFFT equal to or less than 5° C., preferably 0° C., and which produces coatings with equivalent gloss and block resistance as existing styrene-based dispersions without the use of coalescent agents. In accordance with the invention, acrylic based polymer dispersions meeting these requirements have been produced by control of the morphology and chemistry of the polymer particles.

Gradient feed and power feed technologies have been explored as an alternative to the more traditional core-shell approach to obtain polymer dispersions with improved characteristics. In such approaches, the monomer and/or initiator compositions of the reactor feeds are varied continuously throughout the process to obtain polymer dispersions with gradually varying (gradient) morphology.

For example, U.S. Pat. No. 5,756,573 to Trumbo et al. ("Trumbo") discloses a seed polymerized latex polymer having a gradient polymer morphology surrounding a latex seed core. The polymerization process comprises introducing latex seed particles having a number average particle size of about 20 to about 60 nanometers, and introducing a first monomer feed composition and a second monomer feed composition simultaneously to an emulsion polymerization reaction zone. The feed rates of the monomer feeds, having a $T_g$ difference of preferably greater than 25° C., are then varied continuously to obtain a seed polymerized latex polymer having a gradient polymer morphology and a number average particle size less than about 100 nanometers. The latex polymer of Trumbo is said to be useful in the production of wood coatings having excellent print resistance and a high gloss finish. In addition to the complexity involved in preparing a latex seed particle ex situ, the latex seed particles employed in Trumbo are preferably composed of polystyrene.

U.S. Pat. No. 7,173,083 to Scheerder et al. ("Scheerder") discloses an aqueous composition comprising components: (A) 50 to 99 wt. % of a vinyl polymer(s) having a gradient polymeric morphology; and (B) 1 to 50 wt. % of at least one polymer not having a gradient polymeric morphology, wherein components (A) and (B) add up to 100%, and wherein component (A) is blended with component (B). The monomer feeds used to prepare the polymer with a gradient polymeric morphology usually differ with respect to, for example, glass transition temperature ($T_g$), monomer functionality (for example the use of crosslinking, acid functional or adhesion promoting monomers), hydrophilicity, refractive index, molecular weight or simply a variation in the concentration of the respective monomers in each monomer feed. Dispersion blends usually suffer from reduced gloss, when compared to the corresponding core-shell analogs prepared in a single emulsion polymerization process. Further, Scheerder discloses styrene and derivatives thereof as a suitable vinyl monomer for forming vinyl polymer(s) with gradient polymer morphology.

U.S. Pat. No. 6,617,389 to Delaunoit et al. ("Delaunoit") discloses an aqueous polymer dispersion for use in water based glossy lacquers. The polymer dispersion is formed from monomer compositions A and B, wherein the difference of the $T_g$ of A and B after monomer polymerization is at least 60° C. and the highest of such $T_g$ is at least 40° C. The polymer dispersion is produced by a power feed method, wherein the monomer composition A, which is added to the reactor, is continuously replenished by monomer composition B. This power feed process is applied throughout the main polymerization phase to obtain polymer particles substantially composed of polymer chains with varying composition. In such a full gradient approach, it is difficult to achieve dispersions with a sufficiently high block resistance while exhibiting a low MFFT. Further, Delaunoit discloses styrene and derivatives thereof as suitable monomers.

U.S. Pat. No. 3,804,881 to Bassett et al. ("Bassett") generally discloses that non-uniform copolymers can be produced by continuously introducing at least one primary polymerizable feed composition to a polymerization zone, which is continually varying in compositional content of the reactants therein, while simultaneously adding at least one different secondary polymerizable feed composition, so as to continually change the compositional content of the reactants. Bassett discloses styrene and derivatives thereof as suitable polymerizable reactants.

DE 10041680 to Porzio et al. ("Porzio") discloses an aqueous polymer dispersion prepared by radical-initiated aqueous emulsion polymerization of monomer mixtures (M1, M2) added according to a specific feed procedure. Polymerization is performed in a vessel fed with a monomer stream (m) formed from partial streams, m1 and/or m2, of M1 and M2, respectively, and during the process the proportion of m2 in m increases. At the start of feeding, m comprises at least 90 weight percent M1 but at the end it contains at least 90 weight percent M2. When used alone, M1 produces a polymer of glass transition temp ($T_{g,1}$) not over 50° C. while M2, alone, produces a polymer with similar temperature ($T_{g,2}$) over 50° C., with at least a 10° C. difference between $T_{g,1}$ and $T_{g,2}$. The ratio of total amounts of M1 and M2 is 20:80 to 60:40. The power feed process is applied throughout the main polymerization phase. All the examples in the reference have fairly high MFFT values (>25° C.). It is further difficult to achieve dispersions with a sufficiently high block resistance while exhibiting a low MFFT by utilization of a gradient approach alone.

WO 2013/088187 to Deller et al. ("Deller") discloses a polymer dispersion comprising particles of a polymer composition formed at least partially by emulsion polymerization of at least first and second, simultaneously added, substantially styrene-free, monomer feeds in the presence of an initiator in a reaction zone. The first monomer feed comprises monomers selected to produce a copolymer having a glass transition temperature less than or equal to about −10° C. and the second monomer feed comprises monomers selected to produce a copolymer having a glass transition temperature greater than or equal to about 50° C. The relative rate of addition of the first and second monomer feeds into the reaction zone is continuously changed during at least part of the emulsion polymerization and the rate of addition of the initiator is changed step-wise at least once during the addition of the first and second monomer feeds. Although the process of Deller yields a styrene-free polymer dispersion with a MFFT below 5° C., coatings produced from the dispersion have been found to exhibit insufficient block resistance.

SUMMARY

In one aspect, the invention resides in a polymer dispersion produced by polymerization of at least two different ethylenically unsaturated monomers in at least two stages wherein:

the polymer produced in a first stage comprises 25 to 60% by weight of the total monomer composition and has a uniform glass transition temperature from −30° C. to 0° C.;

the polymer produced in a second stage comprises 40 to 75% by weight of the total monomer composition and has a variable monomer composition such that the second stage polymer has a non-uniform glass transition temperature which varies between a first value from −30° to +10° C. and second value of at least +70° C.;

any polymer produced in further polymerization stages comprises no more than 10% by weight of the total monomer composition; and the glass transition temperature of the hypothetical uniform copolymer produced by the total monomer composition is in the range from 0° C. to 25° C.

In a further aspect, the invention resides in a process for preparing a polymer dispersion by multi-stage emulsion polymerization, the process comprising:

(a) supplying at least one ethylenically unsaturated monomer to a polymerization reaction zone in a first polymerization stage under conditions to produce a first polymer having a uniform glass transition temperature from −30° C. to 0° C.; and (b) supplying at least two different ethylenically unsaturated monomers to the polymerization reaction zone in a second polymerization stage under conditions to produce a second polymer having a variable monomer composition and a non-uniform glass transition temperature which varies between a first value from −30° to +10° C. and second value of at least +70° C., wherein the first polymer comprises 25 to 60% by weight of the total monomer composition, the second polymer comprises 40 to 75% by weight of the total monomer composition and the overall polymer dispersion contains no more than 10% of monomers polymerized in further polymerization stages, and wherein the glass transition temperature of the hypothetical uniform copolymer produced by the total monomer composition is in the range from 0° C. to 25° C.

In other aspects, the invention resides in coating compositions employing the polymer dispersion described herein.

DETAILED DESCRIPTION

Described herein is a polymer dispersion produced by multi-stage emulsion polymerization of at least two different ethylenically unsaturated monomers such that the polymer particles include a first soft phase having a uniform glass transition temperature and a second phase having a non-uniform glass transition temperature. Also disclosed are methods of producing the polymer dispersion and use of the dispersion in lacquers, varnishes, stains and high-gloss trim paint formulations.

Glass transition temperature ($T_g$) values referred to herein are calculated using the Fox equation, $1/T_g = w_1/T_{g,1} + w_2/T_{g,2} + \ldots + w_n/T_{g,n}$, where $w_1, w_2, \ldots, w_n$ are the weight fractions of monomers 1, 2, ..., n, and $T_{g,1}, T_{g,2}, \ldots, T_{g,n}$ are the glass transition temperatures of their respective homopolymers (in Kelvin), as obtained by radical emulsion polymerization. The $T_g$ values of homopolymers of selected monomers are given in Table 1. The $T_g$ values of other common homopolymers can be found in Polymer Handbook, 4th edition, Brandrup, Immergut, Grulke (Eds.), Wiley, 1999.

TABLE 1

Glass transition temperatures of selected homopolymers

| Monomer | Tg (° C.) |
| --- | --- |
| Methyl methacrylate (MMA) | +105 |
| Styrene | +100 |
| Ethyl acrylate (EA) | −24 |
| Butyl acrylate (BA) | −45 |
| 2-Ethylhexyl acrylate (EHA) | −62 |
| Diacetone acrylamide (DAAM) | +77 |
| 2-(Acetoacetoxy)ethyl methacrylate (AAEM) | +18 |
| Methacrylic acid (MAA) | +228 |
| Acrylic acid (AA) | +165 |
| Methacrylamide | +243 |
| Acrylamide | +165 |

Monomer Compositions

Different monomer compositions are employed in the different polymerization stages of the present process so that the polymer produced during the relevant stage has the required uniform or non-uniform glass transition temperature value or value range. In particular, the monomer composition employed in the first polymerization stage comprises one or more ethylenically unsaturated monomers which, when polymerized, produce a polymer having a uniform glass transition temperature ($T_g$) from −30° C. to 0° C., preferably from −30° C. to −10° C., more preferably from −25° C. to −10° C. The monomer composition used in the second polymerization stage is composed of two or more different ethylenically unsaturated monomers added in continuously varying amounts so that, when polymerized, they produce a polymer having a non-uniform glass transition temperature ($T_g$) which varies between a first value from −30° C. to +10° C. and second value of at least +70° C. Preferably, the second stage polymer has a non-uniform glass transition temperature ($T_g$) varying between a first value from −30° C. to −10° C., more preferably from −25° C. to −10° C., and a second value of at least 90° C.

The polymer produced in the first polymerization stage comprises from 25 to 60% by weight, preferably from 35 to 50% by weight, of the total monomer composition used to produce the polymer dispersion, whereas the polymer produced in the second polymerization stage comprises 40 to 75% by weight, preferably from 50 to 65% by weight, of the total monomer composition. As will be discussed below, further polymerization stages may precede or follow the first and second polymerization stages, but the overall polymer dispersion generally contains no more than 10% of monomers polymerized in such further polymerization stages. In addition, the glass transition temperature of the hypothetical uniform copolymer produced by the total monomer composition is in the range from 0° C. to 25° C., preferably in the range from 5 to 20° C.

Any ethylenically unsaturated monomer or combination of ethylenically unsaturated monomers can be used in the different polymerization stages of the present process provided the resultant polymers have the required glass transition temperature(s). However, in one embodiment, the monomer compositions employed in the present process are composed predominantly, that is at least 50 wt %, such as at least 70 wt %, for example at least 80 wt %, preferably at least 90 wt % by weight of the total monomer composition, of (a) at least two different esters of ethylenically unsaturated carboxylic acids. Esters suitable for use as these main monomers include $C_2$-$C_{18}$ alkyl esters of ethylenically unsaturated carboxylic acids, such as (meth)acrylic acid, maleic acid and fumaric acid. Examples include ethyl acrylate, n-propyl acrylate, isopropyl acrylate, methyl methacrylate, methyl ethacrylate, n-butyl acrylate, t-butyl acrylate, 1-hexyl acrylate, and 2-ethylhexyl acrylate.

In one embodiment, the monomer composition employed in the first polymerization stage may comprise a first ester of an ethylenically unsaturated carboxylic acid chosen so that when polymerized, it produces a homopolymer having a glass transition temperature ($T_g$) of less than or equal to 0° C., generally from about −20° C. to about −70° C. Examples of suitable first esters include ethyl acrylate, isopropyl acrylate, n-butyl acrylate, 1-hexyl acrylate, and 2-ethylhexyl acrylate. In addition, the monomer composition employed in the first polymerization stage may optionally also comprise a second ester of an ethylenically unsaturated carboxylic acid chosen so that when polymerized, it produces a homopolymer having a glass transition temperature ($T_g$) of greater than or equal to +50° C., generally from about +60° C. to about +120° C. Examples of suitable second esters include methyl methacrylate, methyl ethacrylate and t-butyl acrylate.

In one embodiment, the monomer composition employed in the second polymerization stage may comprise both of said first and second esters, with the required $T_g$ variation being achieved by continuously changing the relative feed rates of the different esters.

In addition to the main monomers (a) listed above, the monomer composition employed in any polymerization stage of the present process may also include up to 10% by weight, such as from 0.5 to 5% by weight, of one or more acid monomers (b) comprising at least one of an ethylenically unsaturated carboxylic acid or an anhydride or amide thereof, an ethylenically unsaturated sulfonic acid, or an ethylenically unsaturated phosphonic or phosphoric acid.

For example, the monomer (b) may comprise an ethylenically unsaturated $C_3$-$C_8$ monocarboxylic acid and/or an ethylenically unsaturated $C_4$-$C_8$ dicarboxylic acid, together with the anhydrides or amides thereof. Examples of suitable ethylenically unsaturated $C_3$-$C_8$ monocarboxylic acids include acrylic acid, methacrylic acid and crotonic acid. Examples of suitable ethylenically unsaturated $C_4$-$C_8$ dicarboxylic acids include maleic acid, fumaric acid, itaconic acid and citraconic acid.

Examples of suitable ethylenically unsaturated sulfonic acids include those having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxy-propanesulfonic acid. Examples of suitable ethylenically unsaturated phosphonic or phosphoric acids include vinylphosphonic acid, esters of phosphonic or phosphoric acid with hydroxyalkyl(meth)acrylates and ethylenically unsaturated polyethoxyalkyletherphosphates.

In addition to or instead of said acids, it is also possible to use the salts thereof, preferably the alkali metal or ammonium salts thereof, particularly preferably the sodium salts thereof, such as, for example, the sodium salts of vinylsulfonic acid and of 2-acrylamidopropanesulfonic acid.

The monomer composition employed in any polymerization stage of the present process may also contain up to 10 weight %, such as from 0.5 to 5% by weight, of other ethylenically unsaturated monomers (c), which are co-polymerizable with monomers (a) and, where present, monomer(s) (b). Such optional co-monomers can be those which promote better film or coating performance by the compositions herein or can provide films and coatings of desirable properties. Such desirable film/coating properties can include, for example, enhanced adhesion to surfaces or substrates, improved wet adhesion, better resistance to removal by scrubbing or other types of weathering or abrasion, and improved resistance to film or coating cracking. The optional co-monomers useful for incorporation into the emulsion copolymers of the compositions herein are those which contain one polymerizable double bond along with one or more additional functional moieties. Such optional or auxiliary co-monomers can thus include unsaturated silane co-monomers, glycidyl co-monomers, ureido co-monomers, carbonyl-functional monomers and combinations of these auxiliary optional co-monomers.

Unsaturated silanes useful as optional co-monomers can generally correspond to a substituted silane of the structural Formula I:

Formula I in which R denotes an organic radical olefinically unsaturated in the w-position and $R^1$ $R^2$ and $R^3$ which may be identical or different, denote the group —OZ, Z denoting hydrogen or primary or secondary alkyl or acyl radicals optionally substituted by alkoxy groups. Suitable unsaturated silane compounds of Formula I are preferably those in which the radical R in the formula represents an ω-unsaturated alkenyl of 2 to 10 carbon atoms, particularly of 2 to 4 carbon atoms, or an ω-unsaturated carboxylic acid ester formed from unsaturated carboxylic acids of up to 4 carbon atoms and alcohols of up to 6 carbon atoms carrying the Si group. Suitable radicals $R^1$, $R^2$, $R^3$ are preferably the group —OZ, Z representing primary and/or secondary alkyl radicals of up to 10 carbon atoms, preferably up to 4 carbon atoms, or alkyl radicals substituted by alkoxy groups, preferably of up to 3 carbon atoms, or acyl radicals of up to 6 carbon atoms, preferably of up to 3 carbon atoms, or hydrogen. Most preferred unsaturated silane co-monomers are vinyl trialkoxy silanes.

Examples of preferred silane compounds of the Formula I include γ-methacryloxypropyltris(2-methoxyethoxy)silane, vinylmethoxysilane, vinyltriethoxysilane, vinyldiethoxysilanol, vinylethoxysilanediol, allyltriethoxysilane, vinyltripropoxysilane, vinyltriisopropoxysilane, vinyltributoxysilane, vinyltriacetoxysilane, trimethylglycolvinylsilane, γ-methacryloxypropyltrimethylglycolsilane, γ-acryloxypropyltriethoxysilane and γ-methacryloxypropyltrimethoxysilane.

Glycidyl compounds can also be used as optional auxiliary co-monomers to impart epoxy-functionality to the emulsion copolymer. Examples of suitable glycidyl optional co-monomers include glycidyl acrylate, glycidyl methacrylate, allyl glycidyl ether, and vinyl glycidyl ether.

Another type of optional co-monomer (c) comprises cyclic ureido co-monomers. Cyclic ureido co-monomers are known to impart improved wet adhesion properties to films and coatings formed from copolymers containing these co-monomers. Cyclic ureido compounds and their use as wet adhesion promoting co-monomers are disclosed in U.S. Pat. Nos. 4,104,220; 4,111,877; 4,219,454; 4,319,032; 4,599,417 and 5,208,285. The disclosures of all of these U.S. patents are incorporated herein by reference in their entirety.

Other suitable functional co-monomers (c) include unsaturated compounds that contain one or more carbonyl moieties. Examples of such suitable co-monomers include diacetone acrylamide (DAAM), polymerizable 1,3-dicarbonyl compounds and polymerizable 1,3-diketoamides. Suitable polymerizable 1,3-dicarbonyl compounds include acetoacetoxyethyl acrylate, acetoacetoxyethyl methacrylate (AAEM), acetoacetoxypropyl methacrylate, acetoacetoxybutyl methacrylate, 2,3-di(acetoacetoxy)propyl methacrylate and allyl acetoacetate. Such monomers are known to impart improved wet adhesion properties to coating compositions, especially on alkyd substrates (See DE 2535372 A1). Suitable polymerizable 1,3-diketoamides include those compounds described in U.S. Pat. No. 5,889,098, which patent is incorporated herein by reference. Examples of compounds of this type include amido acetoacetonates such as 3-isopropenyl-α,α-dimethylbenzyl amidoacetoacetate, 4-isopropenyl-α,α-dimethylbenzyl amidoacetoacetate, 4-ethylenyl-phenyl amidoacetoacetate and the like.

Optionally, the monomer compositions used in the present process may also contain up to 3% by weight, such as from 0.1 to 2% by weight, of monomers (d) with at least two non-conjugated ethylenically unsaturated groups. Such cross-linking co-monomers include triallyl cyanurate, triallyl isocyanurate, diallyl maleate, diallyl fumarate, divinyl benzene, diallyl phthalate, hexanediol diacrylate, ethyleneglycol dimethacrylate, and polyethylene glycol diacrylate.

In some embodiments, the monomer compositions used herein may also contain from 0.05 to 3 wt %, such as from 0.1 to 1 wt %, of a chain transfer agent. Suitable chain transfer agents include mercaptans and particularly alkyl thiols, such as methylthiol, ethylthiol, n-propylthiol, n-butylthiol, n-hexylthiol, n-octylthiol, n-decylthiol, n-dodecylthiol, n-tetradecylthiol, n-hexadecylthiol, n-octadecylthiol, cyclohexylthiol, isopropylthiol, tert-butylthiol, tert-nonylthiol, and tert-dodecylthiol.

Typically, the monomer compositions used herein contain less than 5 wt % styrene. Preferably, they are substantially styrene-free, i.e. they contain no measurable amount of styrene. In general, other vinyl aromatic monomers should also be avoided.

Preparation of the Polymer Dispersion

The desired polymer dispersion is produced by multi-stage free radical emulsion polymerization in an aqueous medium and in the presence of one or more free radical initiators. Suitable free radical initiators include hydrogen peroxide, benzoyl peroxide, cyclohexanone peroxide, isopropyl cumyl hydroperoxide, persulfates of potassium, of sodium and of ammonium, peroxides of saturated monobasic aliphatic carboxylic acids having an even number of carbon atoms and a C8-C12 chain length, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctanoate, bis(3,5,5-trimethyl)hexanoyl peroxide, tert-butyl perpivalate, hydroperoxypinane, p-methane hydroperoxide. The abovementioned compounds can also be used within redox systems, using transition metal salts, such as iron(II) salts, or other reducing agents. Alkali metal salts of oxymethanesulfinic acid, hydroxylamine salts, sodium dialkyldithiocarbamate, sodium bisulfite, ammonium bisulfite, sodium dithionite, diisopropyl xanthogen disulfide, ascorbic acid, tartaric acid, and isoascorbic acid can also be used as reducing agents.

The present emulsion polymerization process includes at least two distinct stages. In the first polymerization stage, one or more ethylenically unsaturated monomers as described above are added to a polymerization reaction zone, either as a single feed or as multiple feeds, under conditions so as to produce the first polymer having a uniform glass transition temperature from −30° C. to 0° C., preferably from −30° C. to −10° C., more preferably from −25° C. to −10° C. For example, a monomer feed 1 may be added to the polymerization reaction zone during the first polymerization stage, optionally together with a different monomer feed 2, at either constant or varying rate under conditions so as to produce the first polymer having a uniform glass transition temperature from −30° C. to 0° C., preferably from −30° C. to −10° C., more preferably from −25° C. to −10° C. In some embodiments, monomer feeds 1 and 2 are added simultaneously to the reaction zone at constant feed rates so as to produce the first polymer having a uniform glass transition temperature from −30° C. to 0° C., preferably from −30° C. to −10° C., more preferably from −25° C. to −10° C.

In the second polymerization stage, two or more ethylenically unsaturated monomers as described above are added simultaneously to the polymerization reaction zone at continuously varying relative rates so as to produce the second polymer having a non-uniform glass transition temperature varying between a first value from −30° to +10° C. and second value of at least +70° C., preferably between a first value of −30 to −10° C. and a second value of at least +90° C., more preferably between a first value from −25° C. to −10° C., and a second value of at least +90° C. In some embodiments, the glass transition temperature of the second polymer is gradually increased during the second polymerization stage, while in other cases the glass transition temperature of the second polymer can be gradually decreased during the second polymerization stage.

For example, a monomer feed 1 and a different monomer feed 2 may be simultaneously added to the reaction zone in the second polymerization stage while constantly increasing or decreasing the feed rate of at least one of the feeds so as to obtain a polymer with a glass transition temperature gradient between a first value from −30° to +10° C. and second value of at least +70° C. (gradient technology). Alternatively, the monomer feed 2 may be continuously added to the monomer feed 1 during the second polymerization stage, while adding monomer feed 1 to the reaction zone so as to obtain a polymer with a glass transition temperature gradient between a first value from −30° to +10° C. and second value of at least +70° C. (power feed technology). Gradient technology is the preferred process.

The conditions in the first and second polymerization stages can be the same or different but generally include a temperature between from 40 to 120° C., preferably from 50 to 110° C., and most preferably from 60 to 95° C.

The first polymerization stage can be conducted prior to the second polymerization stage, or the second polymerization stage can be conducted before the first polymerization stage. In addition, the first and second polymerization stages can be preceded by an initial polymerization step, in which part of the first and/or the second monomer feed is polymerized in the reaction zone to produce a seed polymer. In addition, further polymerization stages can be conducted after the first and second polymerization stages described above. However, the overall polymer dispersion generally contains no more than 10% of monomers polymerized outside of the first and second polymerization stages.

The present emulsion polymerization process is carried out in the presence of a stabilization system which comprises one or more stabilizers selected from protective colloids, anionic and/or non-ionic surfactants and mixtures thereof. Generally, the stabilizer(s) are present in the aqueous polymerization mixture in an amount between 0.5 and 15% by weight based on the total weight of monomer(s) in the mixture. Surfactant stabilizers are preferred.

Suitable nonionic surfactants which can be used as stabilizers in the present process include polyoxyethylene condensates, although it is generally preferred to minimize the use of ethoxylated nonionics based on alkylphenols (APEs). For purposes of this invention, dispersions and coating compositions are considered to be substantially free of APEs if they contain less than 500 ppm of alkylphenol ethoxylates. Exemplary polyoxyethylene condensates that can be used include polyoxyethylene aliphatic ethers, such as polyoxyethylene lauryl ether and polyoxyethylene oleyl ether; polyoxyethylene alkaryl ethers, such as polyoxyethylene nonylphenol ether and polyoxyethylene octylphenol ether; polyoxyethylene esters of higher fatty acids, such as polyoxyethylene laurate and polyoxyethylene oleate, as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thioethers such as polyoxyethylene n-dodecyl thio-ether.

Nonionic surfactants that can be used also include a series of surface active agents available from BASF under the Pluronic™ and Tetronic™ trade names. Pluronic surfactants are ethylene oxide (EO)/Propylene oxide (PO)/ethylene oxide block copolymers that are prepared by the controlled addition of PO to the two hydroxyl groups of propylene glycol. EO is then added to sandwich this hydrophobe between two hydrophilic groups, controlled by length to constitute from 10% to 80% (w/w) of the final molecule. PO/EO/PO block copolymers also available under the trade name Pluronic and are prepared by adding EO to ethylene glycol to provide a hydrophile of designated molecular weight. PO is then added to obtain hydrophobic blocks on the outside of the molecule. Tetronic surfactants are tetrafunctional block copolymers derived from the sequential addition of PO and EO to ethylene-diamine. Tetronic surfactants are produced by the sequential addition of EO and PO to ethylene-diamine. In addition, a series of ethylene oxide adducts of acetyleneic glycols, sold commercially by Air Products under the Surfynol™ trade name, are suitable as nonionic surfactants. Additional examples of nonionic surfactants include Disponil™ A 3065 (alcohol ethoxylate), Emulsogen™ EPN 407 (alkyl polyglycol ether with 40 EO), and Emulsogen™ EPN 287 (alkyl polyglycol ether with 28 EO).

Suitable anionic surfactants comprise alkyl-, aryl- or alkylaryl-sulfonates and alkyl, aryl or alkylaryl sulfates, phosphates or phosphonates, whereby it also is possible for oligo- or polyethylene oxide units to be located between the hydrocarbon radical and the anionic group. The polymer dispersion may be stabilized by a combination of nonionic and anionic surfactants. Preferably, the dispersion is stabilized by anionic surfactants alone. Typical examples of anionic surfactants include sodium lauryl sulfate, sodium undecylglycol ether sulfate, sodium octylphenol glycol ether sulfate, sodium dodecylbenzene sulfonate, sodium lauryl ether sulfate, and ammonium tri-tert-butylphenol-glycol ether sulfate. Preferred anionic surfactants are those not comprising APE-structural units.

Also suitable as stabilizers for the present dispersions are copolymerizable nonionic and anionic surfactants such as those disclosed in US 2014/0243552. Other suitable copolymerizable surfactants are sold under the trade names Hitenol BC, Hitenol KH, Adeka Reasoap SR, and Adeka Reasoap ER.

Conventionally, various protective colloids such as carboxymethyl cellulose (CMC), hydroxyethyl cellulose (HEC) and other conventional protective colloid-forming materials have also been used to stabilize polymer latex compositions of the types hereinbefore described, instead of or in addition to the surfactant emulsifiers. In one embodiment, the dispersions and compositions herein can contain up to about 5 wt % of protective colloid stabilizing agents, based on the total amount of copolymers in the dispersions or compositions being stabilized.

In another embodiment, the dispersions and compositions herein can be substantially free of such protective colloids as stabilizing agents. Such dispersions are considered to be "substantially free" of protective colloids if protective colloids comprise no more than 0.5 wt % of the dispersions, based on the total amount of copolymers in the dispersions being stabilized.

On completion of the polymerization, a further, preferably chemical after-treatment, especially with redox catalysts, for example combinations of the above-mentioned oxidizing agents and reducing agents, may follow to reduce the level of residual unreacted monomer on the product. In addition, residual monomer can be removed in known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm).

The polymerized particles produced by the present process typically have a weight-averaged diameter of less than 150 nm, preferably less than 120 nm, as measured by a combination of laser diffraction and polarization intensity differential scattering (PIDS) using a Beckman Coulter LS 13320 Particle Size Analyzer.

In addition to monomers described herein, the final polymers may also contain a water-soluble cross-linking agent. Such a cross-linking agent will react with specific polymer functionalities such as carbonyl or 1,3-dicarbonyl groups as water is removed from the coating compositions herein and as a film or coating is formed from the polymerized components.

A type of water-soluble cross-linking agent that can be used in the compositions herein comprises a compound which contains at least two hydrazine and/or hydrazide moieties. Particularly suitable are dihydrazine compounds of aliphatic dicarboxylic acids of 2 to 10, in particular 4 to 6, carbon atoms, e.g., oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and/or itaconic acid dihydrazide. Water-soluble aliphatic dihydrazines of 2 to 4 carbon atoms, e.g., ethylene-1,2-dihydrazine, propylene-1,3-dihydrazine or butylene-1,4-dihydrazine, are also suitable. Adipic acid dihydrazide (ADH) is a preferred water-soluble cross-linking agent for use in the compositions herein, especially those produced from monomer compositions containing diacetone acrylamide (DAAM).

Other suitable water-soluble cross-linking agents are compounds which contain at least two amine functional moieties such as ethylene diamine and hexamethylene diamine. Such cross-linking agents are preferred in combination with polymers comprising 1,3-dicarbonyl groups, such as acetoacetoxyethyl methacrylate (AAEM).

Generally, such water-soluble cross-linking agents are post added to the dispersion such that the molar ratio of cross-linking agent functional groups to polymer functional groups is between about 0.1 and about 2.0. More preferably the molar ratio of cross-linking agent functional groups to copolymer functional groups in the blend will be between about 0.5 and 2.0.

After polymerization the dispersion is typically neutralized to alkaline pH. This can be accomplished by, for example, the addition of an organic or inorganic base, such as an amine, ammonia or an alkali metal hydroxide, such as potassium hydroxide. In some embodiments, it is preferred to effect neutralization with a nitrogen-free base.

The aqueous polymer dispersions produced by the process of the invention generally have a solids content of from 30 to 70% by weight, preferably from 40 to 55% by weight. In some embodiments, it may be desirable to prepare water-redispersible polymer powders from the polymer dispersions prior to their ultimate use as a coating composition. This is conveniently achieved by drying the aqueous dispersions, following the optional addition of protective colloids as a spraying aid, for example by means of fluidized bed drying, freeze drying, or spray drying. Preferably, the dispersions are spray-dried. Spray drying takes place in standard spray-drying units, in which atomization may take place by means of one-fluid, two-fluid or multifluid nozzles, or with a rotating disk. The chosen exit temperature is generally in the range from 45° C. to 120° C., preferably from 60° C. to 90° C., depending on the unit, on the $T_g$ of the resin, and on the desired degree of drying.

Coating/Paint Composition Formulation and Preparation

The aqueous polymer dispersions described herein are stable fluid systems which can be used to produce coating compositions suitable for use as high gloss trim paints, lacquers, varnishes and wood stains. When used in paint applications, the aqueous polymer dispersions are typically combined with one or more conventional fillers and/or pigments. In this context, pigments are understood as solids which have a refractive index greater than or equal to 1.75, whereas fillers are understood as meaning solids which have a refractive index of less than 1.75.

Preferred fillers useful in the paint compositions herein can be, for example, calcium carbonate, magnesite, dolomite, kaolin, mica, talc, silica, calcium sulfate, feldspar, barium sulfate and opaque polymers. Examples of white pigments useful in the paint compositions herein can be zinc oxide, zinc sulfide, basic lead carbonate, antimony trioxide, lithopone (zinc sulfide+barium sulfate) and, preferably, titanium dioxide. Examples of inorganic colored pigments which may preferably be used in the paint compositions herein include iron oxides, carbon black, graphite, luminescent pigments, zinc yellow, zinc green, Paris blue, ultramarine, manganese black, antimony black, manganese violet, bismuth vanadate or Schweinfurt green. Suitable organic colored pigments preferably are, for example, sepia, gamboge, Cassel brown, toluidine red, para red, Hansa yellow, indigo, azo dyes, anthraquinone and indigo dyes as well as dioxazine, quinacridone, phthalocyanin, isoindolinone and metal complex pigments of the azomethine series.

The fillers may be used as individual components. Mixtures of fillers such as, for example, calcium carbonate/kaolin and calcium carbonate/kaolin/talc have also been found to be particularly useful in practice. To increase the hiding power of the coating and to save on titanium dioxide, finely divided fillers such as, for example, finely divided calcium carbonate and mixtures of various calcium carbonates with different particle size distribution are frequently used. Calcined clays are commonly used to increase film dry opacity as they help incorporate air voids into the dry film. Air voids create a big difference in refractive index in the film and scatter light, yielding more opacity in the film once cured. To adjust the hiding power, the shade and the depth of color of the coatings formed, the fillers are mixed with appropriate amounts of white pigment and inorganic and/or organic colored pigments.

To disperse the fillers and pigments in water, auxiliaries based on anionic or non-ionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris(methylenephosphonate), may be added.

Thickeners may also be added to the paint formulations herein. Thickeners which may be used include, inter alia, sodium polyacrylate and water-soluble copolymers based on acrylic and methacrylic acid, such as acrylic acid/acrylamide and methacrylic acid/acrylic ester copolymers. Hydrophobically-modified alkali soluble (acrylic) emulsions (HASE), hydrophobically-modified ethoxylate (poly)urethanes (HEUR), hydrophobically-modified ethoxylate (poly)urethane alkali-swellable/soluble emulsions (HEURASE), polyether polyols (PEPO), and polyurea thickeners are also available. Inorganic thickeners, such as, for example, bentonites or hectorite, may also be used.

For various applications, it is sometimes also desirable to include small amounts of other additives, such as biocides, pH modifiers, and antifoamers, incorporated in the latex paint compositions herein. This may be done in a conventional manner and at any convenient point in the preparation of the latexes.

Commercially available coalescent agent free high gloss trim paints may contain other components which serve to raise the Volatile Organic Content of the paint formulation. Volatile Organic Content means any organic compound having an initial boiling point less than or equal to 250° C.

measured at a standard pressure of 1013 mbar. Preferably the coating composition does additionally not contain any Semi-Volatile Organic Content (SVOC), which usually refers to compounds having a boiling point higher than 250° C. Main contributors to VOC/SVOC are coalescent agents which reduce the MFFT, such as butyl glycol, butyl diglycol, butyl diglycol acetate, 1-methoxy-2-propanol, 3-methoxy-1-butanol, texanol, ethyl diglycol, dipropylene glycol monomethyl ether, and dipropylene glycol n-butyl ether, and plasticizers, which increase the elasticity of the coating, such as 2,2,4-trimethyl-1,3-pentanediol diisobutyrate (TXIB), hexylene glycol, triethylene glycol-bis-2-ethylhexanoate (3G8), Loxanol® PL 3060, and Benzoflex™. Further VOC sources may include co-solvents, including glycols, which help with wet edge application, open time, and freeze-thaw resistance, emulsion components and most additives at low levels. For instance, amino methyl propanol is a volatile compound used to adjust pH.

Volatile Organic Content is defined according to the hereinbefore-mentioned Directive 2004/42/CE of the European Parliament and The Council of The European Union and measured according to ISO 11890-2. Commercially available trim paints may have VOC levels up to 130 g/L. In contrast, coating compositions based on the polymer dispersions described herein can have a very low volatile organic content (VOC), such as less than 30 g/L, preferably less than 5 g/L, most preferably less than 1 g/L.

Coating/Paint Composition Performance

When used in a coating composition, such as a high gloss trim paint, lacquer, stain, or varnish, the polymer dispersion described herein forms a film or coating which, upon curing, will adhere to a substrate onto which the trim paint has been applied. The coating composition seals and protects the substrate.

The minimum temperature required for the polymer dispersion or coating composition to form a film is referred to as the Minimum Film-Forming Temperature or MFFT (DIN ISO 2115). The MFFT is related to the glass transition temperature, $T_g$, of the polymer dispersion. The polymer dispersion herein will preferably have a MFFT of equal to or less than about 5° C., preferably 0° C.

As noted above, another important performance property of trim paints relates to block resistance. Blocking refers to the relative tackiness of a dry coating. It is desirable that two dry, coated surfaces when placed in contact do not block or stick together. The polymer dispersion herein, with their selected monomers along with the selected type of cross-linking system, exhibit excellent resistance to blocking of the high gloss trim paint.

Addition of fluorocarbon surfactants can also serve to improve block resistance even further by modifying surface properties. A fluorocarbon surfactant acts as a surface-active agent that blooms to the top of a film (the air interface) as it dries or cures and acts as a release layer that interferes with the intermingling of resin layers of two films in contact with one another.

Fluorocarbon surfactant additives of this class may be obtained from DuPont™ under the designation Capstone™ or Zonyl®, or 3M™ under the designation Novec™, for example. See "DuPont™ Zonyl® Fluoroadditives as Anti-block Agents, A Comparative Study", Product Literature, January 2003. See also, United States Patent Application 2008/0145552 to Berrettini et al. which provides examples of suitable fluoroadditives. See also U.S. Pat. No. 7,041,727 to Kubicek et al.

The invention will now be more particularly described with reference to the following non-limiting Examples.

EXAMPLE 1

Emulsion polymerization of feeds 1 and 2, as described in Table 2, was conducted as follows.

(a) A 3 liter reactor equipped with a reflux condenser and an anchor stirrer was filled with 600 g of deionized (DI) water and 17.86 g of Disponil FES 27 (a 28% aqueous solution of a sodium alkyl ether sulfate with 2 ethylene oxide units). The reactor content was heated to 80° C. and 4.0% of feed 1 was added. A solution of 0.5 g ammonium persulfate in 20 g of water was added and the reactor contents were held at 80° C. for 15 min (seed polymerization).

(b) Subsequently, 413.3 g of feed 1 and the total amount of feed 2 were added to the reactor in parallel over 126 min as follows: The feed rate of feed 1 was linearly increased from 0 g/min to 6.56 g/min, and the feed rate of feed 2 was linearly decreased from 8.28 g/min to 0 g/min. After completion of this first dosage phase, the remaining 551.1 g of feed 1 were added in 84 min with a constant feed rate in a second dosage phase.

(c) The reactor temperature during the feed additions was maintained at 80° C. After completion of the feed additions, the reactor content was held at 80° C. for another 60 minutes and then cooled to room temperature. 16 g of aqueous ammonium hydroxide solution (12.5%) were added to the dispersion 30 min after the completion of the feed additions and at room temperature. 86.7 g of a 10% aqueous adipic acid dihydrazide solution and a defoamer solution (0.25 g Tego Foamex 805 in 10 g DI water) were added at room temperature.

The properties of the resulting polymer dispersion are summarized in Table 3.

EXAMPLE 2

The process of Example 1 was repeated but in step (b) 643 g of feed 1 were added to the seed polymer produced in (a) with a constant feed rate in 105 min. After completion of this first dosage phase, the remaining part of feed 1 and feed 2 were added in parallel in a second dosage phase over 105 min as follows: The feed rate of feed 1 was linearly decreased from 6.12 g/min to 0 g/min, and the feed rate of feed 2 was linearly increased from 0 g/min to 9.94 g/min.

The properties of the resulting polymer dispersion are summarized in Table 3.

EXAMPLE 3

The process of Example 1 was repeated but in step (b) 723 g of feed 1 were added with a constant feed rate in 126 min. After completion of this first dosage phase, the remaining part of feed 1 and feed 2 were added in parallel in a second dosage phase over 84 min as follows: The feed rate of feed 1 was linearly increased from 0 g/min to 5.74 g/min, and the feed rate of feed 2 was linearly decreased from 12.42 g/min to 0 g/min.

The properties of the resulting polymer dispersion are summarized in Table 3.

EXAMPLE 4

Comparative, Core-Shell

The process of Example 1 was repeated but in step (b) the remaining part of feed 1 was added with a constant feed rate in 140 min in a first dosage phase, followed by addition of feed 2 with a constant feed rate in 70 min in a second dosage phase.

The properties of the resulting polymer dispersion are summarized in Table 3.

EXAMPLE 5

Comparative, Core-Shell

The process of Example 1 was repeated but in step (b) feed 2 was added with a constant feed rate in 70 min in a first dosage phase, followed by addition of the remaining part of feed 1 with a constant feed rate in 140 min in a second dosage phase.

The properties of the resulting polymer dispersion are summarized in Table 3.

EXAMPLE 6

Comparative, Full Gradient

The process of Example 1 was repeated but in step (b) the remaining part of feed 1 and the total amount of feed 2 were added in parallel in a single dosage phase over 210 min as follows: The feed rate of feed 1 was linearly decreased from 9.19 g/min to 0 g/min, and the feed rate of feed 2 was linearly increased from 0 g/min to 4.97 g/min.

The properties of the resulting polymer dispersion are summarized in Table 3.

EXAMPLE 7

Comparative, Full Gradient

The process of Example 1 was repeated but in step (b) the remaining part of feed 1 and the total amount of feed 2 were added in parallel in a single dosage phase over 210 min as follows: The feed rate of feed 1 was linearly increased from 0 g/min to 9.19 g/min, and the feed rate of feed 2 was linearly decreased from 4.97 g/min to 0 g/min.

The properties of the resulting polymer dispersion are summarized in Table 3.

TABLE 2

Composition[1] of the feeds (in grams)

Feed 1

| | |
|---|---|
| DI water | 295.2 |
| Disponil FES 27 | 23.4 |
| Ammonium persulfate | 2.0 |
| Methacrylic acid (MAA) | 13.1 |
| Diacetone acrylamide (DAAM) | 14.8 |
| Methyl methacrylate (MMA) | 131.2 |
| Butyl acrylate (BA) | 524.8 |

Feed 2

| | |
|---|---|
| DI water | 154.8 |
| Disponil FES 27 | 12.3 |
| Ammonium persulfate | 1.0 |
| Methacrylic acid (MAA) | 6.9 |
| Diacetone acrylamide (DAAM) | 2.6 |
| Methyl methacrylate (MMA) | 344.0 |

[1]The glass transition temperature of the hypothetical uniform copolymer produced by the total monomer composition is 11.3° C., as calculated by the Fox equation.

TABLE 3

Properties of the polymer dispersions

| | Solid content (%)[1] | Brookfield viscosity (mPa s)[2] | pH | $d_w$ (nm)[3] | MFFT (° C.)[4] | $T_{g,1}$ (° C.)[5] | $T_{g,2}$ (° C.)[5] |
|---|---|---|---|---|---|---|---|
| Example 1 | 45.7 | 280 | 8.7 | 100 | 0 | 106.6 to −21.3 | −21.3 |
| Example 2 | 46.0 | 672 | 8.7 | 90 | 0 | −21.3 | −21.3 to 106.6 |
| Example 3 | 45.9 | 558 | 8.7 | 90 | 0 | −21.3 | 106.6 to −21.3 |
| Example 4 | 45.8 | 912 | 8.8 | 90 | 8 | −21.3 | 106.6 |
| Example 5 | 45.8 | 468 | 8.8 | 110 | 0 | 106.6 | −21.3 |
| Example 6 | 46.0 | 718 | 8.4 | 90 | 0 | −21.3 to 106.6 | — |
| Example 7 | 45.7 | 184 | 8.2 | 100 | 0 | 106.6 to −21.3 | — |

[1]gravimetric determination after 24 h drying at 110° C.
[2]measurement conditions: 20° C., 20 rpm, spindle 2
[3]weight-average particle diameter as determined by a Beckman Coulter LS 13320 Particle Size Analyzer
[4]according to DIN ISO 2115
[5]Glass transition temperature (ranges) of the polymers produced by the monomer compositions of polymerization phases 1 and 2, as calculated by the Fox equation

EXAMPLE 8

Preparation and Properties of Lacquers

High gloss white lacquers were prepared by mixing the ingredients in Table 4 at room temperature under stirring. The resulting lacquers had a solid content of approx. 50.6% and their pigment volume concentration (p.v.c) was approx. 17.

TABLE 4

High gloss lacquer composition

| | Parts per weight |
|---|---|
| Grind | |
| DI water | 65 |
| Polymeric dispersion agent (Lopon 890) | 8 |
| Polyacrylate HASE thickener (Mowilith LDM 7002) | 15 |
| Defoamer (Byk 21) | 2 |
| Biocide (Mergal K 10N) | 2 |
| Ammonium hydroxide (25%) | 3 |
| AMP 90 (Aminomethylpropanol) | 2 |
| Titanium dioxide (Tronox CR 828) | 210 |
| Let down | |
| Polymer dispersion as per Examples 1-7 | 596 |
| Wax emulsion (Südranol 240) | 20 |
| DI water | 92 |

The properties of the resulting high gloss lacquers are displayed in Table 5.

TABLE 5

Properties of the high gloss lacquers

| | Blocking (50° C., g/6.25 cm²)[1] | Blocking (25° C., g/6.25 cm²)[1] | Good block resistance?[2] | Elongation at break (%)[3] |
|---|---|---|---|---|
| Example 1 | 760 | 110 | yes | 35 |
| Example 2 | 850 | 270 | yes | 30 |
| Example 3 | 1340 | 200 | yes | 42 |
| Example 4 | 1180 | 170 | yes | 20 |

TABLE 5-continued

Properties of the high gloss lacquers

|  | Blocking (50° C., g/ 6.25 cm²)[1] | Blocking (25° C., g/ 6.25 cm²)[1] | Good block resistance?[2] | Elongation at break (%)[3] |
|---|---|---|---|---|
| Example 5 | 4500 | 1300 | no | 53 |
| Example 6 | 3440 | 1100 | no | 60 |
| Example 7 | 5000 | 1430 | no | 63 |

[1]Leneta contrast cards (75 × 25 mm) glued to wooden panels were coated at a wet film thickness of 200 μm. After drying for 24 h, two coated cards were placed on top of each other at a 90° angle with their coated sides facing each other. They were then subjected to a force of 2 kg at 50° C. (second column) or 25° C. (third column) for 1 h. Subsequently, the force required to separate the cards was determined.
[2]Values below 1500 g/6.25 cm² at 50° C. and below 500 g/6.25 cm² at 25° C. indicate good block resistance.
[3]The lacquer was applied to a PE film at a wet film thickness of 300 μm. 3 free-standing films with a length of at least 100 mm and a width of 15 mm were prepared after 7 days, mounted into a tensile tester and pre-stressed with a force of 200 mN. The initial length between the clamps was 50 mm and the strain rate was 200 mm/min. Reported is the average value for the three specimens.

From Tables 3 and 5, it can be seen that the dispersions of the invention exhibit a unique combination of an MFFT below 5° C., a good block resistance and a good elongation at break when used in a coating composition.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A polymer dispersion produced by polymerization of at least two different ethylenically unsaturated monomers in at least two stages wherein:
   the polymer produced in a first stage comprises 25 to 60% by weight of the total monomer composition and has a uniform glass transition temperature from −30° C. to 0° C.;
   the polymer produced in a second stage comprises 40 to 75% by weight of the total monomer composition and has a variable monomer composition of at least two different ethylenically unsaturated monomers such that the second stage polymer has a non-uniform glass transition temperature which varies between a first value from −30° to +10° C. and second value of at least +70° C.;
   any polymer produced in further polymerization stages comprises no more than 10% by weight of the total monomer composition; and
   the glass transition temperature of a hypothetical uniform copolymer produced by the total monomer composition is in the range from 0° C. to 25° C., as calculated by the Fox equation.

2. A polymer dispersion according to claim 1 with a minimum film forming temperature (MFFT) of equal or less than 5° C.

3. A polymer dispersion according to claim 1, wherein each of the first and second stage polymers comprises an ester of an ethylenically unsaturated carboxylic acid.

4. A polymer dispersion according to claim 1, wherein each of the first and second stage polymers comprises a $C_2$ to $C_{18}$ alkyl ester of an ethylenically unsaturated carboxylic acid.

5. A polymer dispersion according to claim 1, wherein each of the first and second stage polymers contains less than 5% styrene.

6. A polymer dispersion according to claim 1, wherein one or both of the first and second stage polymers further comprises at least one of an ethylenically unsaturated carboxylic acid or an anhydride, salt or amide thereof, an ethylenically unsaturated sulfonic acid or salt thereof, or an ethylenically unsaturated phosphonic or phosphoric acid or salt thereof.

7. A polymer dispersion according to claim 1, wherein one or both of the first and second stage polymers further comprises at least one auxiliary co-monomer selected from unsaturated silane co-monomers, glycidyl co-monomers, ureido co-monomers, carbonyl-functional monomers and combinations thereof.

8. A polymer dispersion according to claim 1, wherein one or both of the first and second stage polymers comprise at least one carbonyl-functional monomer and also contains at least one water-soluble crosslinking agent.

9. A polymer dispersion according to claim 8, wherein the carbonyl-functional monomer is diacetone acrylamide and the water-soluble crosslinking agent is adipic dihydrazide.

10. A polymer dispersion according to claim 8, wherein the carbonyl-functional monomer is acetoacetoxyethyl methacrylate and the water-soluble crosslinking agent contains at least two amine-functional groups.

11. A polymer dispersion according to claim 1, wherein one or both of the first and second stage polymers comprises a monomer with at least two non-conjugated ethylenically unsaturated groups.

12. A polymer dispersion according to claim 1, wherein one or both of the first and second stage polymers further comprises a chain transfer agent.

13. A polymer dispersion according to claim 1, wherein the particles of the polymer composition have a weight-averaged diameter of less than 150 nm, as measured by laser diffraction and polarization intensity differential scattering.

14. A water-redispersible powder produced by drying a polymer dispersion according to claim 1.

15. A process for preparing a polymer dispersion by multi-stage emulsion polymerization, the process comprising:
   (a) supplying at least one ethylenically unsaturated monomer to a polymerization reaction zone in a first polymerization stage under conditions to produce a first polymer having a uniform glass transition temperature from −30° C. to 0° C.; and
   (b) supplying at least two different ethylenically unsaturated monomers to the polymerization reaction zone in a second polymerization stage under conditions to produce a second polymer having a variable monomer composition and a non-uniform glass transition temperature which varies between a first value from −30° to +10° C. and second value of at least +70° C.,
   wherein the first polymer comprises 25 to 60% by weight of the total monomer composition, the second polymer comprises 40 to 75% by weight of the total monomer composition and the overall polymer dispersion contains no more than 10% of monomers polymerized in further polymerization stages, and
   wherein the glass transition temperature of the hypothetical uniform copolymer produced by the total monomer composition is in the range from 0° C. to 25° C.

16. A process according to claim 15, wherein the ethylenically unsaturated monomers are composed predominantly of esters of ethylenically unsaturated carboxylic acids.

17. A process according to claim 15, wherein said at least two different ethylenically unsaturated monomers are provided to step (b) in first and second monomer feeds of different composition and the rate of supply of at least one of the feeds to the polymerization reaction zone is continuously increased or decreased during the second polymerization stage.

18. A process according to claim 15, wherein said at least two different ethylenically unsaturated monomers are provided to step (b) in first and second monomer feeds of different composition and wherein the second monomer feed is continuously added to the first monomer feed as the first monomer feed is continuously supplied to the polymerization reaction zone.

19. A process according to claim 15, wherein the glass transition temperature of the second polymer is continuously increased during the second polymerization stage.

20. A process according to claim 15, wherein the glass transition temperature of the second polymer is continuously decreased during the second polymerization stage.

21. A process according to claim 15, wherein the first polymerization stage is conducted before the second polymerization stage.

22. A process according to claim 15, wherein the first polymerization stage is conducted after the second polymerization stage.

23. A process according to claim 15 and further comprising:

(c) polymerizing at least one of the first and second different ethylenically unsaturated monomers in said polymerization reaction zone in a third polymerization stage, prior to the first and second polymerization stages, under conditions to produce particles of a seed polymer.

24. A coating composition comprising the polymer dispersion of claim 1.

25. The coating composition of claim 24, wherein the composition is a lacquer or varnish, a high gloss trim paint or a wood stain.

* * * * *